United States Patent [19]

Mori

[11] 3,732,754
[45] May 15, 1973

[54] ELECTRONIC GOVERNOR FOR AUTOMOTIVE AUTOMATIC TRANSMISSION

[75] Inventor: Yoichi Mori, Tsurami-ku, Yokohama, Japan

[73] Assignee: Nissan Motor Company, Limited, Kanagawa-ku, Yokohama City, Japan

[22] Filed: Jan. 26, 1972

[21] Appl. No.: 220,971

Related U.S. Application Data

[63] Continuation-in-part of Ser. No. 872,124, Oct. 29, 1967, abandoned.

[30] Foreign Application Priority Data

Oct. 30, 1968 Japan ........................... 43/78835

[52] U.S. Cl. ............................................. 74/866
[51] Int. Cl. ........................................... B60k 21/02
[58] Field of Search ................................. 74/866

[56] References Cited

UNITED STATES PATENTS

| | | |
|---|---|---|
| 3,019,666 | 1/1962 | Brennan et al. .................. 74/866 |
| 3,068,715 | 12/1962 | Brennan et al. ................ 74/866 X |
| 3,267,762 | 8/1966 | Reval .............................. 74/866 X |
| 3,354,744 | 11/1967 | Kuhnle et al. ................... 74/866 X |
| 3,433,101 | 3/1969 | Scholl et al. ..................... 74/866 |
| 3,448,640 | 6/1969 | Nelson ............................ 74/866 |

*Primary Examiner*—Charles J. Myhre
*Assistant Examiner*—Thomas C. Perry
*Attorney*—John Lezdey

[57] ABSTRACT

A control device for electronically controlling the gear shifts in an automotive automatic transmission in response to changes in the vehicle speed and in the displacement of the accelerator pedal. Signals are produced representing the changes at any given time in the vehicle speed and position of the accelerator pedal to raise the gear shifting point to higher vehicle side particularly when the vehicle is running on an ascent or descent or when the engine is operating at a low temperature.

4 Claims, 18 Drawing Figures

INVENTOR
YOICHI MORI
BY John Ledley
ATTORNEY

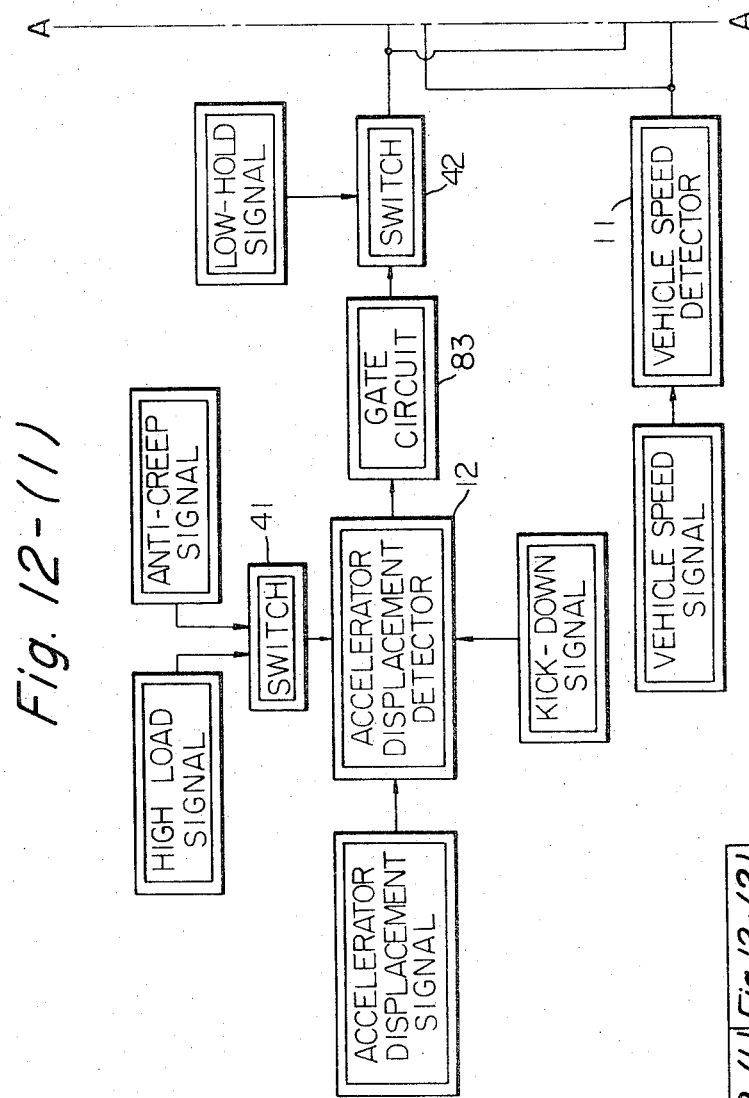
Fig. 12-(1)

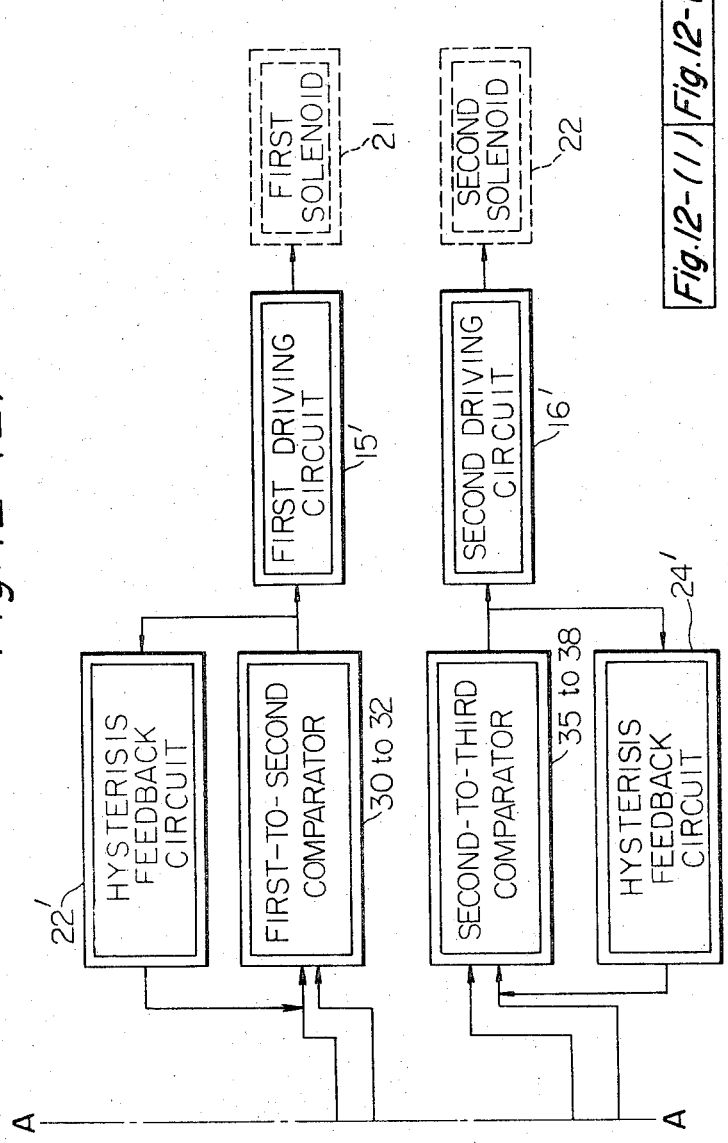

ELECTRONIC GOVERNOR FOR AUTOMOTIVE AUTOMATIC TRANSMISSION

This is a continuation-in-part application of the application Ser. No. 872,124 filed on Oct. 29, 1969, now abandoned.

The present invention relates to a control device for electronically controlling the gear shifts in an automatic transmission, and more particularly to a control device used as a governor for electronically controlling the shifting points of an automatic transmission for various driving conditions in accordance with vehicle speed by using a tachometric generator connected to the output shaft of the vehicle and with the displacement of the accelerator pedal by using a variable resistor element.

The conventional governor is controlled merely by the vehicle speed and displacement of the accelerator pedal for determining the shifting points of an automatic transmission. This invites a serious lack of sufficient engine torque or braking effect by the engine particularly when the vehicle is going uphill with insufficient engine torque as a result of premature upshifting, or when it is going downhill with insufficient braking effect as a result of late downshifting due to early shifting, or when it is running down on a descent with no engine brake applied, or when the engine temperature is not high enough.

In order to overcome these and other disadvantages that are inherent in the conventional governor and to offer increased reliability of the gear shifting performance of the governor or control device, the present invention contemplates to provide a novel and improved control device of the type which is adapted to raise the shifting point to the higher vehicle speed side especially when the automobile is ascending or descending or when the engine temperature thereof is low during warming-up operation.

The features and advantages of the present invention will become apparent from the following description taken in conjunction with the accompanying drawings, in which:

FIG. 12 is a block diagram showing the control device of the invention as shown in FIGS. 1 to 4, 5, 7, 9 and 10;

Figure 1:
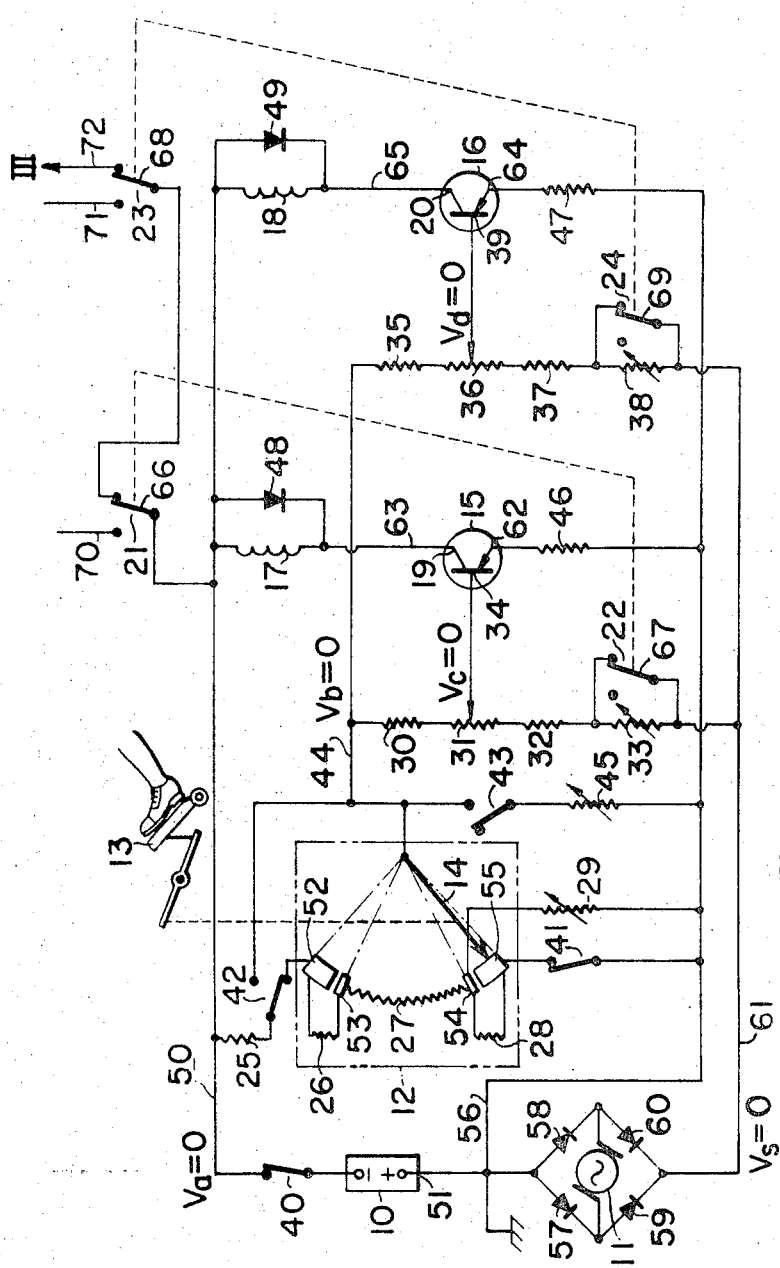
FIG. 1 is a connection diagram showing the circuit arrangement of a control device as constructed according to the present invention, the arrangement being shown to be in its neutral condition.

Referring now to FIG. 1, the control device according to this invention comprises a d.c. power source or storage battery 10, a voltage generator means having vechicle speed detector or tachometric generator 11 connected to a driven or output shaft of the vehicle such as the wheel axle and bridge rectifier, an accelerator displacement detector or variable resistor means element 12 for producing a signal voltage corresponding to the displacement of an accelerator pedal 13 which may control the position of the throttle valve (not shown) in the vehicle engine and which may be mechanically linked with a wiper arm 14 of the variable resistor element 12, two PNP transistors 15 and 16 acting as driving circuits for determining the shifting points between the first or low and the second or intermediate speeds, and between the second or intermediate and the third or high speeds, respectively, first and second solenoids 17 and 18 for switching the delivery of the speed shifting signals when energized by the current flowing through collectors 19 and 20 of the transistors 15 and 16, respectively, so that relays 21, 22 and 23, 24 are switched on and off, respectively, by the solenoids 17 and 18.

In order to provide a proper accelerator displacement signal, there are provided resistor elements 25, 26, 27, 28 and 29, which resistors are all in series with each other and connected between the positive and negative terminals of the storage battery 10.

There are also provided in series resistor elements 30, 31, 32 and 33 for setting the potential of a base 34 of the transistor 15, and also provided in series resistor elements 35, 36, 37 and 38 for setting the potential of a base 39 of the transistor 16.

This control device also comprises a power switch 40 for switching on and off the d.c. potential from the storage battery 10 to the variable resistor element 12.

According to an important feature of the invention, there is provided a switch 41 which changes the shifting patterns to a high speed side so as to make, when it is open, the shifting points suitable for the high load condition, when the vehicle is on an ascent, when an efficient braking effect by the engine is required or when the engine is operating at a low temperature. In other words, the switch 41 is adapted to produce a high load signal. Switches 42 and 43, when actuated, hold the low speed range in the transmission so that the potential of a circuit line 44 is set merely by the resistor element 25 and variable resistor element 45. This means that the switches 42 and 43 can produce a low-hold signal.

This device further comprises emitter resistor elements 46 and 47 for setting the current flowing through the transistors 15 and 16, respectively.

In order to protect the transistors 15 and 16 against overcurrent, diodes 48 and 49 are connected in parallel with the solenoids 17 and 18, respectively, in the collector circuits of the transistors 15 and 16.

The storage battery 10 supplies voltage $Va$ through a line 50 and a grounded line 51. The variable resistor element 12 includes, as shown, a plurality of sliding contacts 52, 53, 54 and 55 spaced from each other. The positive terminal of the battery 10 is connected with the switch 41 and resistor elements 29, 45, 46 and 47 through a grounded line 56. This terminal is also connected with rectifying elements 57 and 58 connected in parallel with rectifying elements 59 and 60 connected in series with the elements 57 and 58, respectively. These rectifying elements 57 to 60 are all connected with the output of the tachometric generator 11 to supply a d.c. voltage which is proportional to the driven shaft speed of the vehicle. A reference voltage $Vb$ is built up by the resistor element 25, switch 42, variable resistor element 12, resistor element 26, contact 53, resistor element 27, contact 54, resistor element 28, sliding contact 55, and switch 41 connected to the circuit line 50 and 56, which reference voltage $Vb$ is fed to the bases 34 and 39 of the transistors 15 and 16, respectively. The tachometric generator 11 generates a voltage proportional to the revolution speed of the driven shaft (which may actually be the wheel axle). The voltage is rectified by the rectifying elements 57, 58, 59 and 60 connected in a bridge form to provide a reference voltage $Vs$ which is also fed to the bases 34 and 39 of the transistors 15 and 16. The resistor element 30, variable resistor element 31, resistor element 32 and variable resistor element 33 connected to the line 44 having the voltage $Vb$ and a line 61 having the voltage $Vs$ build up a reference voltage $Vc$ which is applied directly to the base 34 of the transistor 15. The resistor element 35, variable resistor element 36, resistor elements 37 and 38, connected to the lines 44 and 61, establish a reference voltage $Vd$ which is also fed directly to the base 39 of the transistor 16. The transistor 15 includes an emitter 62 connected through the resistor element 46 to the line 56 and a collector 19 connected through the solenoid 17 and diode 48 in parallel to the bus line 50. The transistor 16, similarly, includes an emitter 64 connected through the resistor element 47 to the line 56 and a collector 20 connected through the solenoid 18 and diode 49 in parallel to the line 50.

Figure 2:
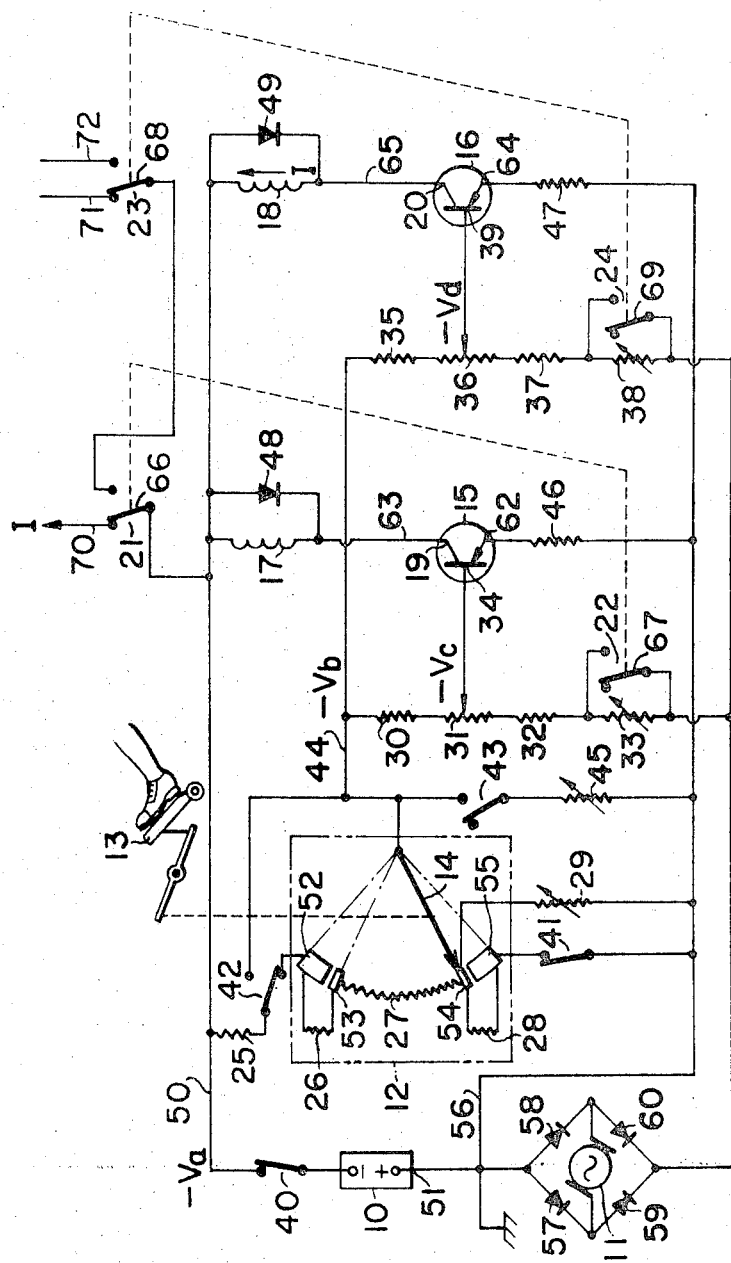
FIG. 2 is similar to FIG. 1, but shows the condition in which the first or low speed is selected.

In operation, when the power switch 40 is closed as shown in FIG. 2, the negative voltage $Va$ is applied to the line 50. If, now, the accelerator pedal 13 of the vehicle is depressed, the wiper arm 14 of the variable resistor element 12 turns clockwise from the position seen in FIG. 1 so that a negative voltage $Vb$ is applied through the arm 14 to the line 44.

Since the tachometric generator 11 does not operate when the vehicle stands still, the voltage $Vs$ across the line 61 is zero so that a negative voltages $Vc$ and $Vd$ are applied through the resistor elements 30, 31, 32 and 33 to the base 34 of the transistor element 15 and through the resistor elements 35, 36, 37 and 38 to the base 39 of the transistor 16, respectively. Thus, the current flows through the emitter 62 and collector 19 of the transistor 15 and the solenoid 17 and also through the emitter 64 and collector 20 of the transistor 16 and the solenoid 18. The arms 66, 67 and 68, 69 of the relay switches 21, 22 and 23, 24, respectively, are moved to the opposite side as seen in FIG. 2 so that the first signal current for establishing the first speed flows to a line 70.

Figure 3:
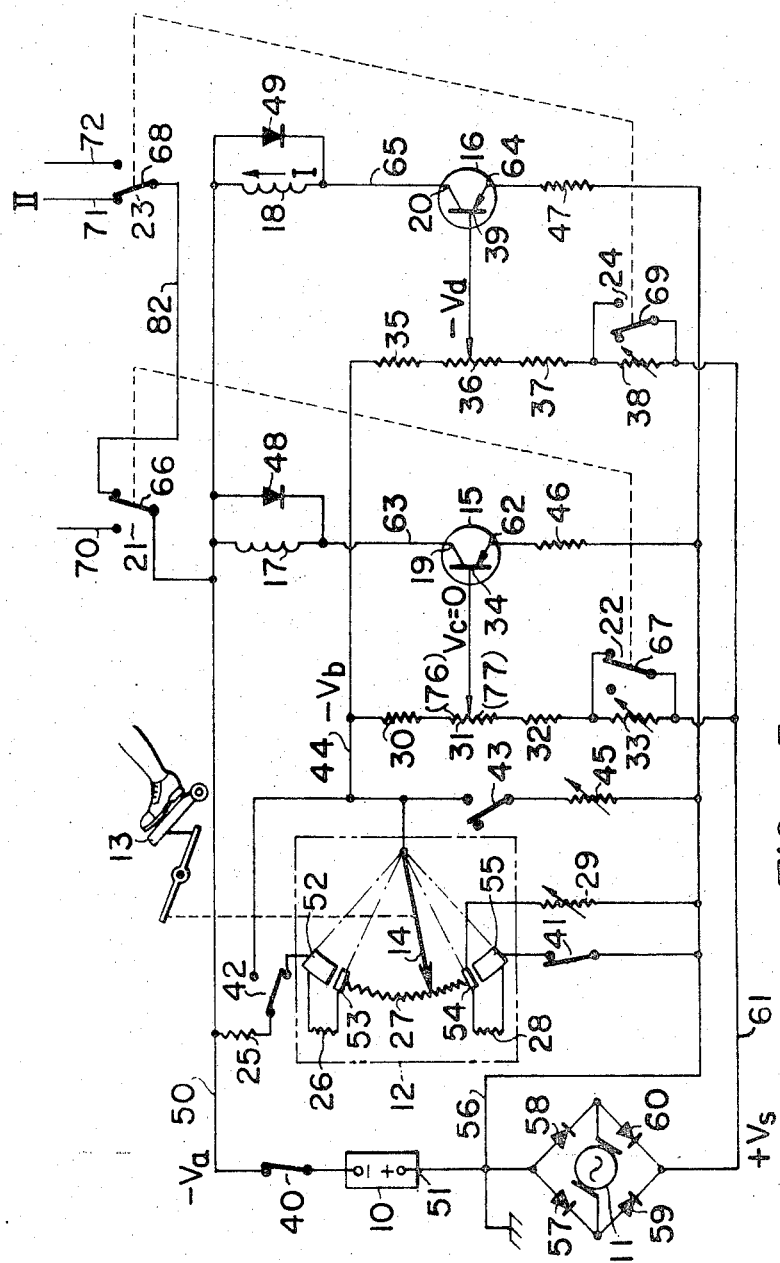
FIG. 3 is similar to FIG. 1, but shows the condition in which the second or intermediate speed is selected.

When the vehicle starts to move, the tachometric generator 11 generates a positive voltage so that the positive voltage $Vs$ rectified by the rectifying means 57, 58, 59 and 60 is passed to the line 61 as shown in FIG. 3. As the vehicle speed further increases, the voltage $Vs$ increases so that the voltages $Vc$ and $Vd$ fed to the bases 34 and 39 of the transistors 15 and 16 increase toward the positive. If the voltage $Vc$ is preset to exceed zero before the voltage $Vd$ does, the transistor 15 becomes nonconducting so that the solenoid 17 is de-energized. This causes the arms 66 and 67 of the relay switches 21 and 22, respectively, to be switched to the positions seen in FIG. 3. Thus, the second signal current for selecting the second speed flows to a line 71.

Figure 4:
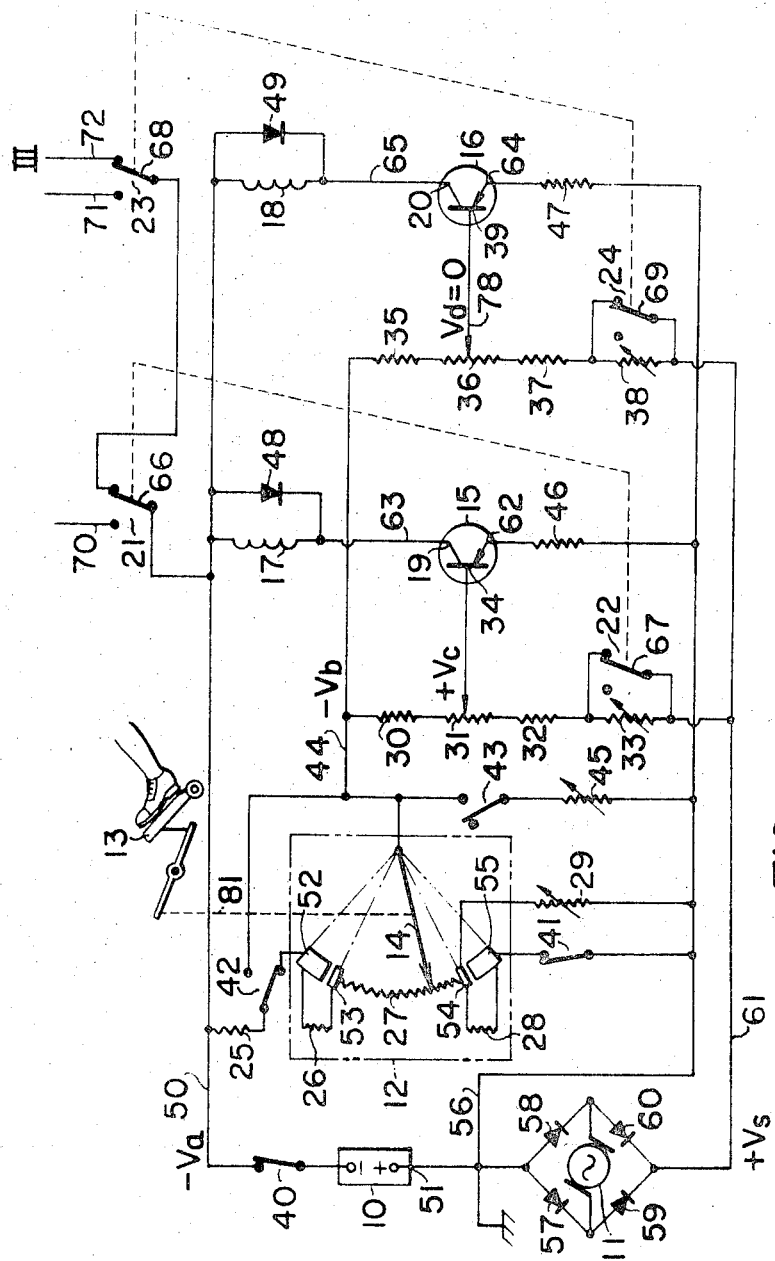
FIG. 4 is similar to FIG. 1, but shows the condition in which the third or high speed is selected.

Referring to FIG. 4, when the vehicle is accelerated further, the tachometric generator 11 generates a higher positive voltage so that an increased voltage $Vs$ rectified by the rectifying elements 57, 58, 59 and 60 is applied to the line 61, whereupon the voltage $Vd$ also exceeds zero. Thus, the transistor 16 also becomes nonconducting so that the solenoid 18 is de-energized to cause the arms 68 and 69 to be switched to the position indicated in FIG. 4. The third signal current for selecting the third speed flows to the conductor 72, consequently.

In order to further clarify the aforementioned operation of the present circuit, the potentials of the reference voltages $Va$, $Vb$, $Vc$ and $Vd$ at the respective operation will be calculated hereinafter.

If the resistance 27 is divided by resistances 73 and 74 by means of the arm 14. The voltage $Vb_1$, when the switch 41 is closed and the switches 42 and 43 held in positions shown in FIG. 4, will be expressed as follows:

$$Vb_1 = \frac{R_{74} + 1/\left(\frac{1}{R_{28}} + \frac{1}{R_{29}}\right)}{R_{25} + R_{26} + R_{27} + 1/\left(\frac{1}{R_{28}} + \frac{1}{R_{29}}\right)} \cdot Va \quad (1)$$

When the arm 14 is on the contacts 52 and 53, respectively, voltages $Vb_{11}$ and $Vb_{12}$ are expressed as follows:

$$Vb_{11} = \frac{R_{26} + R_{27} + 1/\left(\frac{1}{R_{28}} + \frac{1}{R_{29}}\right)}{R_{25} + R_{26} + R_{27} + 1/\left(\frac{1}{R_{28}} + \frac{1}{R_{29}}\right)} \cdot Va \quad (2)$$

$$Vb_{12} = \frac{R_{27} + 1/\left(\frac{1}{R_{28}} + \frac{1}{R_{29}}\right)}{R_{25} + R_{26} + R_{27} + 1/\left(\frac{1}{R_{28}} + \frac{1}{R_{29}}\right)} \cdot Va$$

$$= Vb_{11} - \frac{R_{27}}{R_{25} + R_{26} + R_{27} + 1/\left(\frac{1}{R_{28}} + \frac{1}{R_{29}}\right)} \cdot Va \quad (3)$$

Similarly, when the arm 14 is on the contacts 54 and 55, respectively, voltages $Vb_{13}$ and $Vb_{14}$ are expressed as follows:

$$Vb_{13} = \frac{1/\left(\frac{1}{R_{28}} + \frac{1}{R_{29}}\right)}{R_{25} + R_{26} + R_{27} + 1/\left(\frac{1}{R_{28}} + \frac{1}{R_{29}}\right)} \cdot Va \quad (4)$$

$$Vb_{14} = 0 \quad (5)$$

If a voltage $Vb_2$ is a voltage $Vb$ when the switch 41 is open, then the voltage $Vb_2$ is:

$$Vb_2 = (R_{24} + R_{29})/(R_{25} + R_{26} + R_{27} + R_{29}) \cdot Va \quad (6)$$

Similarly, if voltages $Vb_{21}$, $Vb_{22}$, $Vb_{23}$ and $Vb_{24}$ are to appear as the voltage $Vb$ when the arm 14 is on the contacts 52, 53, 54 and 55, respectively these voltages are expressed as:

$$Vb_{21} = (R_{26} + R_{27} + R_{29})/(R_{25} + R_{26} + R_{27} + R_{29}) \cdot Va \quad (7)$$

$$Vb_{22} = (R_{27} + R_{29})/(R_{25} + R_{26} + R_{27} + R_{29}) \cdot Va \quad (8)$$

$$Vb_{23} = Vb_{24} = R_{29}/(R_{25} + R_{26} + R_{27} + R_{29}) \cdot Va \quad (9)$$

If, furthermore a voltage $Vb_3$ is the voltage $Vb$ when the switches 42 and 43 are shifted to the positions as seen in FIG. 4, the voltage $Vb_3$ is:

$$Vb_3 = R_{45}/(R_{25} + R_{45}) \cdot Va \quad (10)$$

If voltages $Vc_1$ and $Vc_2$ to appear as the voltage $Vc$ when the current flows through the transistors 15 and 16, namely, if the arms 67 and 69 of the contacts of the relay 21 and 23, respectively, are shifted to the opposite positions seen in FIG. 4, they are expressed as:

$$Vc_1 = [(R_{30} + R_{76}) \cdot Vs + (R_{77} + R_{32} + R_{33})]/[R_{30} + R_{31} + R_{32} + R_{33}] \cdot Vb \quad (11)$$

$$Vc_2 = [(R_{30} + R_{76}) \cdot Vs + (R_{77} + R_{32}) \cdot Vb]/[R_{30} + R_{31} + R_{32}] \quad (12)$$

If the voltages $Vd_1$ and $Vd_2$ are to appear as the voltage $Vd$ when the current is absent in the transistors 15 and 16, namely, if the arms 67 and 69, respectively, are shifted to the positions side as seen in FIG. 4, these voltages are:

$$Vd_1 = [(R_{35} + R_{79}) \cdot Vs + (R_{80} + R_{37} + R_{38}) \cdot Vb]/[R_{35} + R_{36} + R_{37} + R_{38}] \quad (13)$$

$$Vd_2 = [(R_{35} + R_{79}) \cdot Vs + (R_{80} + R_{37}) \cdot Vb]/[R_{35} + R_{36} + R_{37}] \quad (14)$$

In all these equations, it is assumed that the resistance 31 is divided by the arm 75 into resistances 76 and 77 and that the resistance 36 is divided by the arm 78 into resistances 79 and 80.

Figure 5:
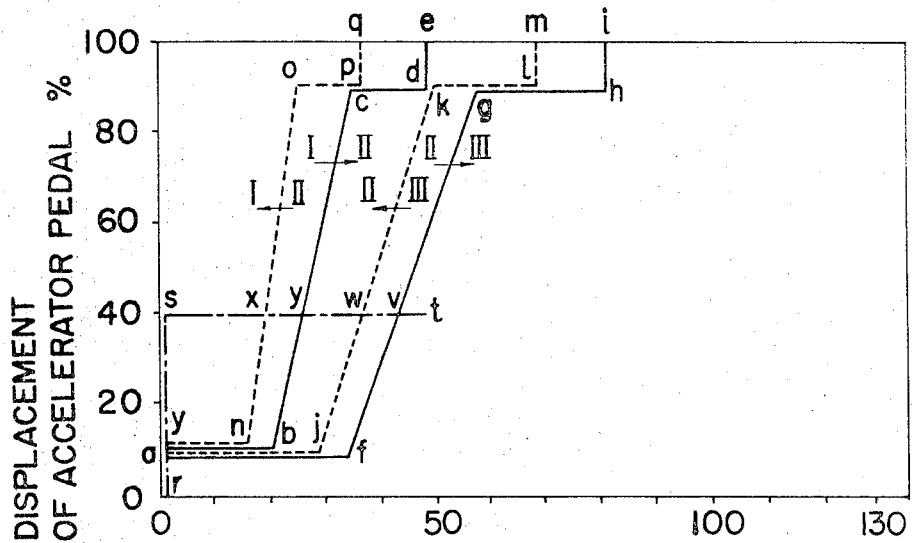
FIG. 5 is a graphical representation of resultant shifting patterns plotted against the vehicle speed and depression of the accelerator.

Referring to FIG. 5, the displacement of the accelerator 13 is indicated in terms of percentage. Here, it is assumed that the vehicle is running on a level road and that the switch 41 is closed to maintain the voltage across the line 44 at $Vb_1$. In this instance, the wiper arm 14 is connected through a linkage designated by 81 to the accelerator pedal 13.

When the vehicle stands still so that the arm 14 of the variable resistor element 12 is on the contact 55 as illustrated in FIG. 1, the reference voltage $Vs$ is equal to zero. Since the arm 14 is held on the sliding contact 55 of the element 12, the voltage $Vb_{14}$ previously described is also equal to zero. This state of the operation of the transmission is indicated at point $r$ in FIG. 5. The reference voltages $Vc$ and $Vd$ are also equal to zero. In this state of the circuit connection, since the collector current is absent in the respective transistors 15 and 16, solenoids 17 and 18 remain de-energized so that the arms 66, 67 and 68, 69, respectively, are moved to the positions shown in FIG. 1. As the consequence, the third speed signals are delivered from the line 72 to the control system of the transmission (not shown). Thus, the switch 41 can produce an anti-creep signal, when it is closed, because the automatic transmission is in the third speed with the lowest engine torque while the vehicle stands still.

When the accelerator pedal 13 is depressed while the vehicle is stopped, the arm 14 of the element 12 shifted to the contact 54 as shown in FIG. 2. With this arm 14 held on the contact 54, the reference voltage $Vb_1$ corresponds to the voltage $Vb_{13}$ as previously calculated. This state of the operation is indicated at point $z$ in FIG. 5. In this state, the voltages $Vc$ and $Vd$ become negative since the voltage $Vb$ is negative so that the collector current flows through both the transistors 15 and 16, thereby to cause the arms 66, 67 and 68, 69, respectively, to be shifted to the positions shown in FIG. 2. Thus, the first speed signal is fed from the line 70 to the control circuit of the transmission (not shown).

When the accelerator pedal 13 is further depressed to such an extent as to correspond to the point $s$ in FIG. 5, the vehicle starts to move so that tachometric generator 11 rotates and produces a positive reference voltage $Vs$ which is fed through the rectifying elements 57, 58, 59 and 60 to the circuit line 61. As the speed increases, the potential of the reference voltage $Vs$ rises so that the voltages $Vc$ and $Vd$ increase from the negative to zero. When the pedal 13 is pressed to such an extent as to correspond with the point $s$ in FIG. 5, the reference voltage $Vb$ is expressed as the $Vb_1$ as previously noted. The voltages $Vc$ and $Vd$ are also represented by the $Vc_1$ and $Vd_1$, respectively, as previously calculated. When the vehicle speed increases to the point $y$ in FIG. 5, the reference voltage $Vc_1$ exceeds zero to render the transistor 15 nonconducting thereby to cut off the current from the solenoid 17. The arms 21 and 22 are then switched over to the positions shown in FIG. 3. Thus, the second speed signal is delivered from the relay switch 21 through a line 82, relay switch 23 and conductor 71 to the control circuit of the transmission (not shown). Since the resistor element 33 is then short-circuited by the relay switch 22 interlocked with the relay 21, the reference voltage $Vc$ becomes the $Vc_2$ which is higher in potential than $Vc_1$ as previously calculated.

When the vehicle speed increases to the point designated by $v$ in FIG. 5, the potential of the reference voltage $Vs$ increases further to cause the reference voltage $Vd$ to rise from the negative to a positive level to cause the transistor 16 to become nonconductive. The current flowing through the solenoid 18 is thus cut off so that the arms 23 and 24 are switched over to the positions indicated in FIG. 4. Thus, the third speed signal is fed through the relay 23 and line 72 to the control system of the transmission (not shown). Here, since the resistor element 38 is short-circuited by the relay switch 24 interconnected with the relay switch 23, the reference voltage $Vd$ rises to $Vd_2$ from $Vd_1$ as previously calculated.

As the vehicle speed decreases from the third to second speed with the accelerator pedal still depressed to such an extent as to correspond to the point $s$ in FIG. 5, the reference voltage $Vd_2$ at which the transistor 16 becomes conducting when the voltage $Vd$ decreases from the positive through zero to the negative is higher than the voltage $Vd_1$ because the resistor element 38 is short-circuited. This causes the transistor 16 to become conducting at the lower reference voltage $Vs$ than when shifted from the second to third speed. Thus, the second speed signal is delivered from the conductor 71 at a lower vehicle speed as indicated at $w$ in FIG. 5. Similarly, the first speed signal is fed from the line 70 at a lower vehicle speed than when shifted from the first to second speed as indicated at $x$ in FIG. 5. The shifting points from the lower to a higher speed and vice versa displays a hysteresis curve. In this way, the relays 22 and 24 can form a hysteresis feedback circuit respectively together with the resistor elements 33 and 38.

It will be understood that similarly to the aforementioned operations where the shifting is effected when the vehicle speed changes with the accelerator pedal pressed constantly, the shifting may be accomplished when the displacement of the accelerator pedal varies while the vehicle speed is kept constant due to the reference voltage $Vb$ being varied.

In FIG. 5, the curve $a$–$b$–$c$–$d$–$e$ indicates the shifting pattern from the first to second speed, the curve $a$–$f$–$g$–$h$–$i$ the shifting pattern from the second to the third, the curve $a$–$j$–$k$–$l$–$m$ the shifting pattern from the third to second speed, and the curve $a$–$n$–$o$–$p$–$q$ the shifting pattern from the second to first speed.

Figure 6:
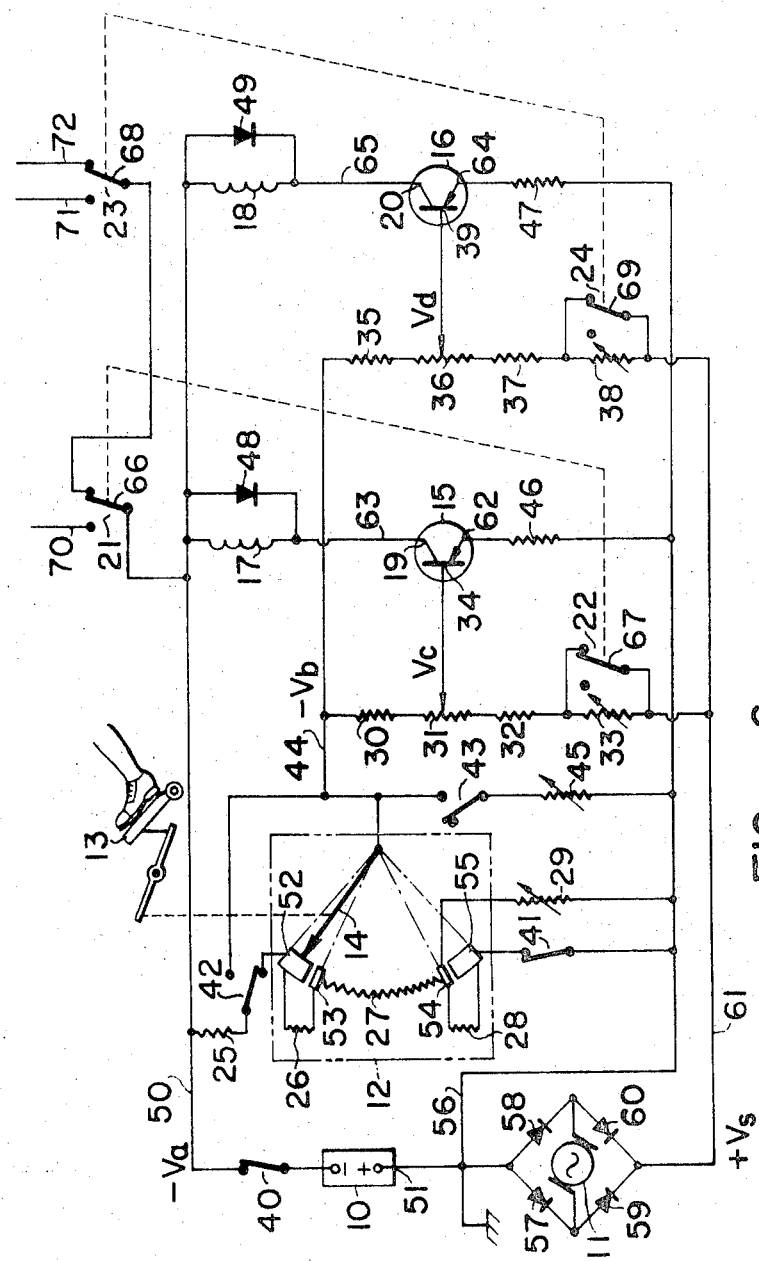
FIG. 6 is similar to FIG. 1, but shows the condition in which the kick-down operation is effected.

As the wiper arm 14 moves, as seen in FIG. 6, from the contact 53 to the sliding contact 52 when the accelerator pedal 13 is fully depressed, the reference voltage $Vb$ varies stepwise to a higher negative voltage as in case the vehicle speed is so high that, to shift down from the third to second, a higher positive reference voltage $Vs$ is required to cause the transistor 16 to become conducting. The shifting pattern thus moves to the higher vehicle speed as illustrated by the lines $l$–$m$ from the third to second, $p$–$q$ from the second to first, $d$–$e$ from the first to second, and $i$–$h$ from the second to third speed as referred to "kickdown".

Figure 8:
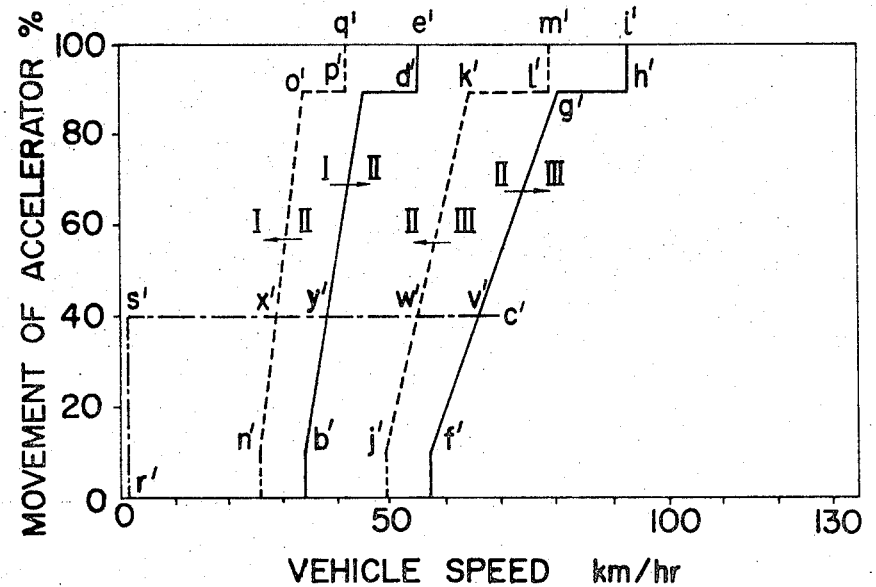
FIG. 8 is similar to FIG. 5, but shows the shifting pattern obtained for the high load operation shown in FIG. 7.
Figure 7:
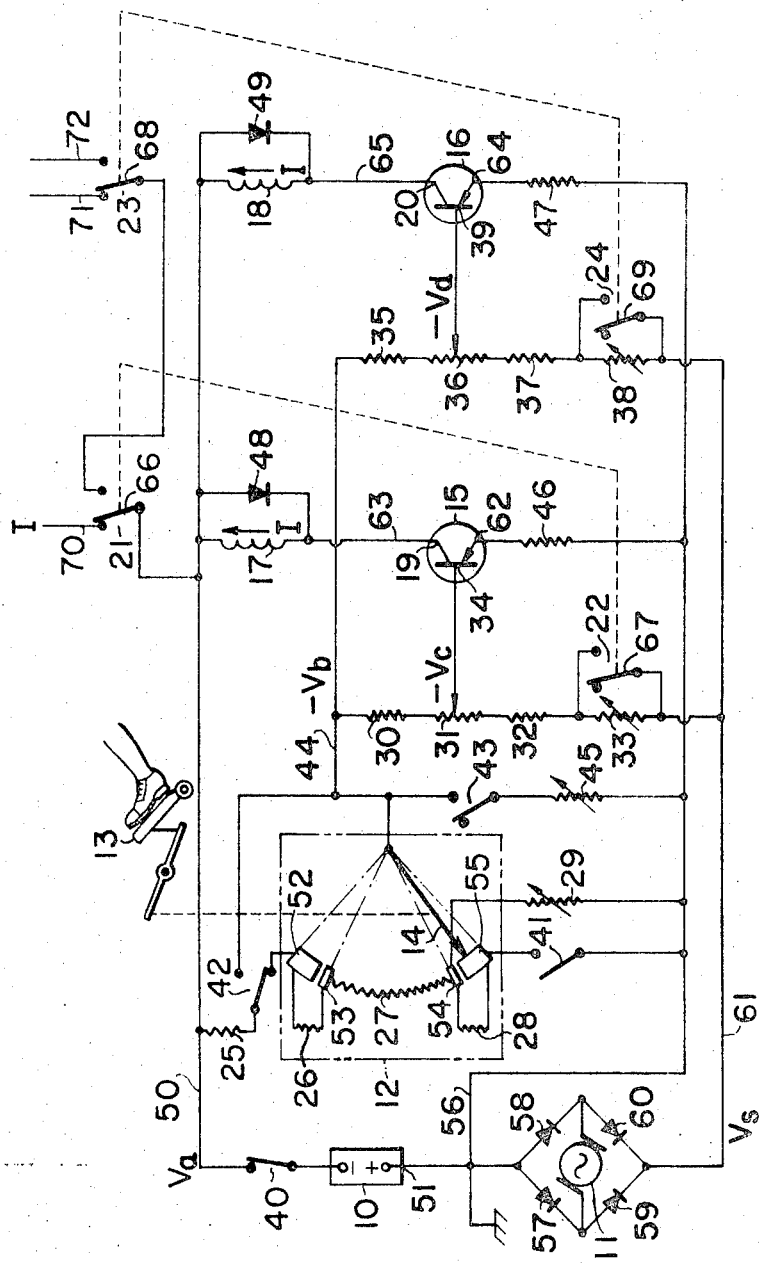
FIG. 7 is similar to FIG. 1, but shows the condition in which the high load operation is effected with the shifting point raised to higher vehicle speed.

As the switch 41 is open, as seen in FIG. 7 to transfer the shifting point to the higher vehicle speed side so as to meet the high engine torque or sufficient braking effect requirement, as when the vehicle is going uphill, or when the engine braking is required for the vehicle to descend, or when the engine is operating at a low temperature, the reference voltage $Vb$ across the line 44 is $Vb_2$ as previously noted. This voltage $Vb_2$ is lower than the voltage $Vb_1$. Thus the reference voltage $Vs$ to nullify the voltages $Vc$ and $Vd$ becomes higher so that the shifting point is moved to a higher speed. This is ascertained from FIG. 8. This is because the resistor element 29 is connected in series with the resistor elements 25, 26, 27, when the switch 41 is open, instead of the resistor element 29 being in parallel with the resistor element 28 which is also connected in series with the resistor elements 25, 26 and 27. In this state, if the arm 14 is on the sliding contact 55, the reference voltage $Vb$ is at all times always negative so that, when the vehicle stops to cause the voltage $Vs$ to become zero, the first speed signal is fed from the line 70, because the resistor element 28 is added in series with the resistor elements 25, 26 and 27 to the arm 14. In FIG. 8, the line $b'$–$c'$–$d'$–$e'$ shows the shifting pattern from the first to second speed, $f'$–$g'$–$h'$–$i'$ from the second to third speed, $j'$–$k'$–$l'$–$m'$ from the third to second, and $n'$–$o'$–$p'$–$q'$ from the second to first speed.

It will be understood that the switch 41 may be switched manually or automatically by means of a signal corresponding to the gradient of an ascent or descent or to the engine temperature.

Figure 9:
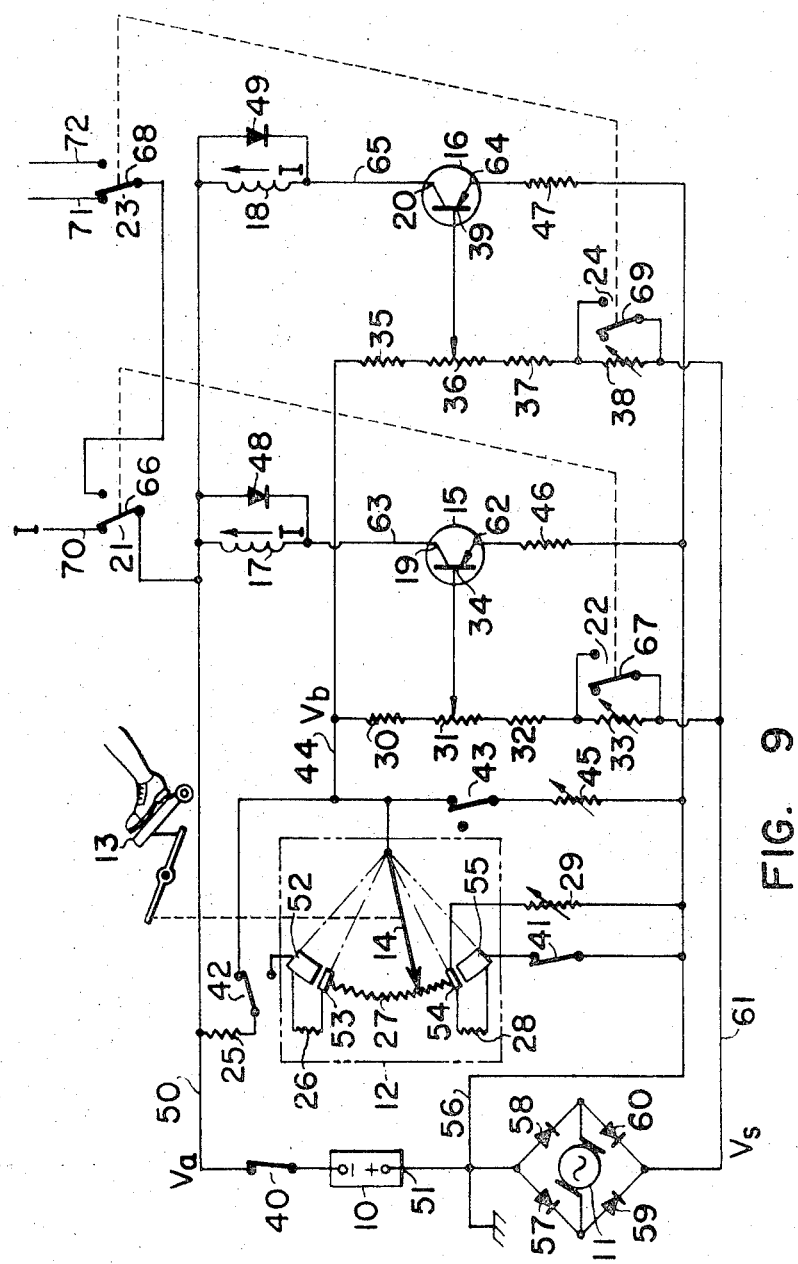
FIG. 9 is similar to FIG. 1, but shows the condition in which the low-hold operation is effected indifferently of the accelerator displacement with the shifting point lowered.

As the switches 42 and 43 are switched, as seen in FIG. 9, to hold the automatic transmission at the low speed ratio such as the first or second speed, the reference voltage $Vb$ across the circuit line 44 becomes $Vb_3$ which is merely determined by the resistor elements 25 and 45 independently of the displacement of the accelerator pedal. Assuming that the resistance value of the variable resistor 45 is equal to the sum of the resistance of the resistor elements 26, 27 and 28, the reference voltage $Vb$ becomes $Vb_{21}$. This kind of state is similar to the aforementioned "kickdown", as indicated by the lines $d'$–$e'$ from the first to second speed, $h'$–$i'$ from the second to third speed, $l'$–$m'$ from the third to second speed, and $p'$–$q'$ from the second to first speed in FIG. 8. Thus, inasmuch as these shifting points are provided independently of the displacement of the accelerator pedal, if the shifting points from the first to second and from the second to third are set at the respective maximum engine speeds, an overrun of the engine can be avoided and also effective braking by the engine is provided when the accelerator pedal is released.

Figure 10:
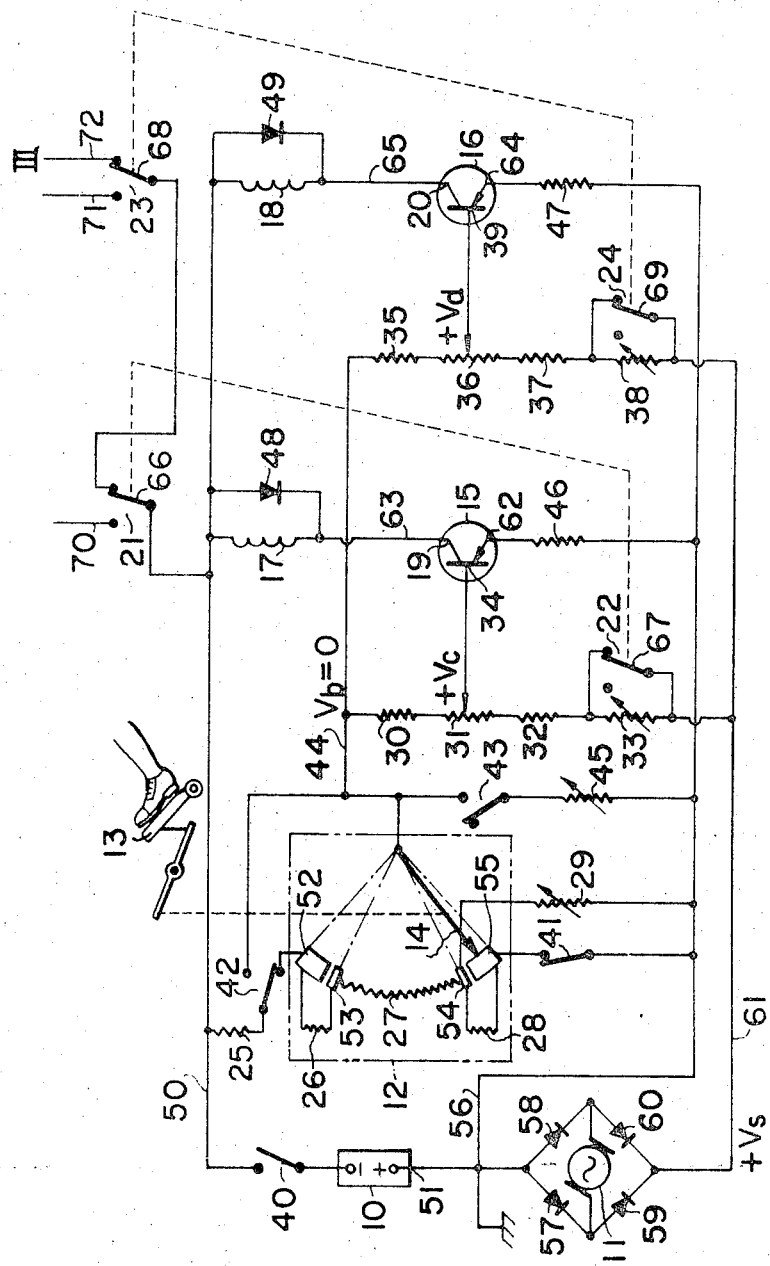
FIG. 10 is similar to FIG. 1, but shows the condition in which the vehicle runs on a level road with reduced accelerator displacement.

When the vehicle is running on a level road with limited throttle opening, as seen in FIG. 10, the accelerator pedal 13 is depressed softly, the wiper arm 14 of the variable resistor element 12 is on the contact 54. The result is that the voltage $Vb$ is zero. Since, on the other hand, the tachometric generator 11 produces a positive voltage as the vehicle is running, the voltage $Vs$ is positive. Thus, the positive voltages $Vc$ and $Vd$ are applied to the bases 34 and 39 of the transistors 15 and 16, respectively, so that the latter is shut off. As a result, the relay switches 21 and 23 are closed, as shown in FIG. 10 so that the signal current to select the third speed is permitted to flow to the line 72.

Figure 11:
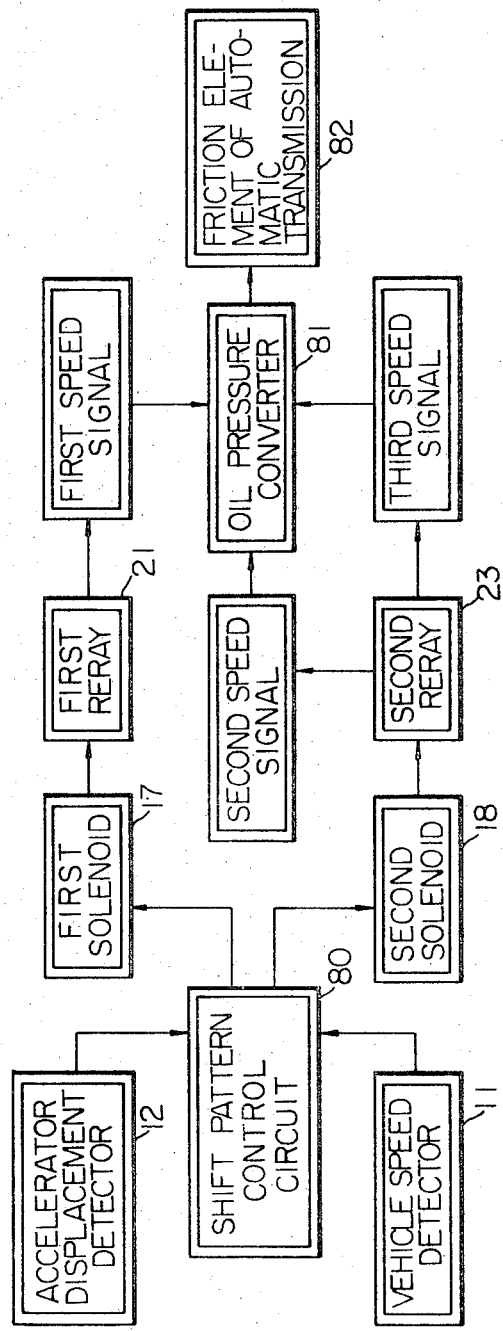
FIG. 11 is a block diagram showing the general concept of the present invention.

Turning now to FIG. 11, there is shown in a block diagram form the electronic control device of the present invention. The control device generally comprises a shift pattern control circuit 80, one of which embodiments has been explained in FIGS. 1 to 10. The control circuit 80 is adapted to energize the first and/or second solenoids 17 and 18 in accordance with the preset shift patterns, which are determined in the invention by the voltage relationship between the outputs of the accelerator displacement detector 12 and the vehicle speed detector 11. The first solenoid 17 actuates the first relay 21 to produce the first on low speed signal at one terminal of the relay, when energized by the control circuit 80. With the first solenoid 17 de-energized, on the other hand, the second solenoid 18 actuates the second relay 23 to produce the second or intermediate signal at one terminal of the relay, when energized by the control circuit. The third or high speed signal appears at the other terminal of the second relay 18, when both of the solenoids are kept de-energized. These three speed signals are, when produced, delivered to an oil pressure converter 81, in which they are converted into respectively corresponding oil pressure signals. More specifically, the oil pressure converter 81 includes a suitable number of actuators which selectively actuate valve members or friction elements 82 (not shown) of an automatic transmission in accordance with the three speed signals to thereby effect a desired gear shift therein. More detailed discussion about the above conversions of the speed signals into the oil pressure signals is made the applicant's copending application, Ser. No. 872,253, filed on Oct. 29, 1969, now U.S. Pat. No. 3,640,156. Therefore, a precise discussion will be made of the shift pattern control circuit 80 with reference to FIGS. 12 to 16, which show another embodiment of the invention even though FIG. 12 is also applied to the first embodiment.

In the following figures, like reference numerals and characters will indicate counterparts of the first embodiment as shown in FIGS. 1 to 10. The major differences between the two embodiments are that the polarity of the bias voltages applied respectively to the accelerator displacement detector 12 and the vehicle speed detector 11 is reversed, and that the relay switches 22 and 24 are replaced by two additional transistors 22' and 24' in FIG. 13.

Figure 13:
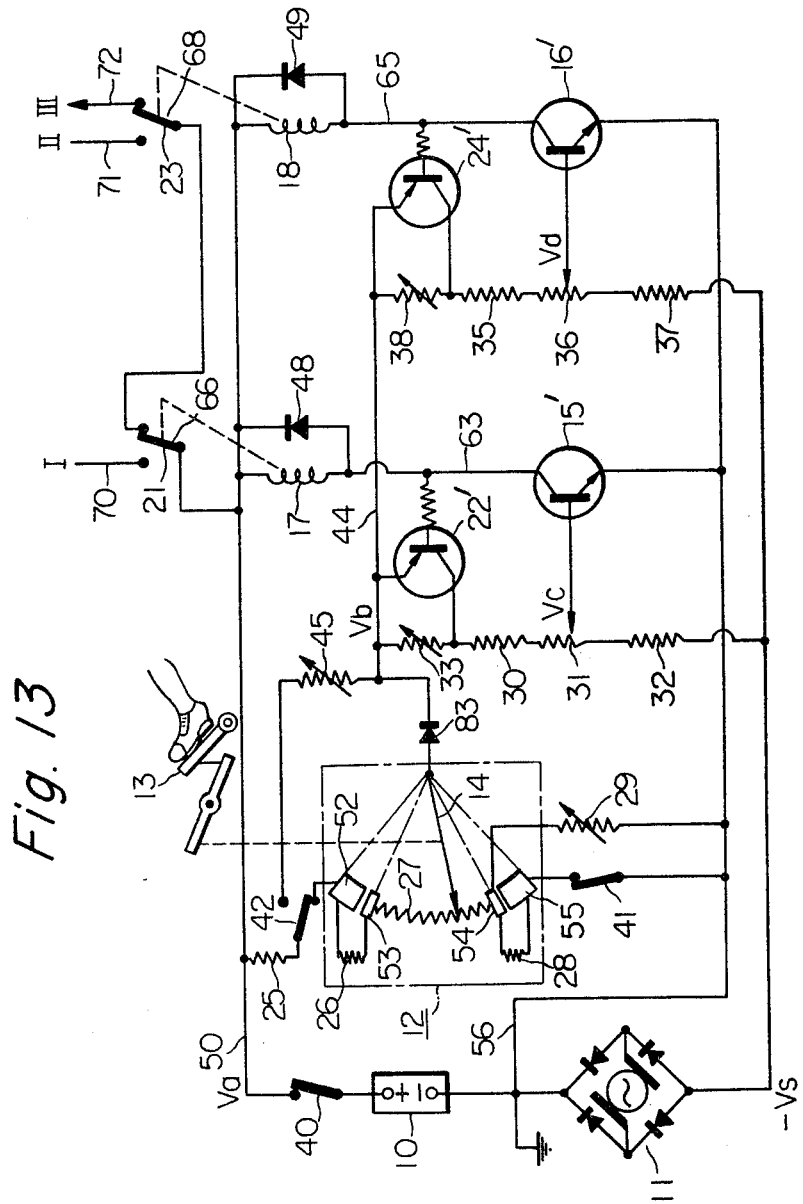
FIG. 13 is similar to FIG. 4, but shows another embodiment of the control device.
Figure 14:
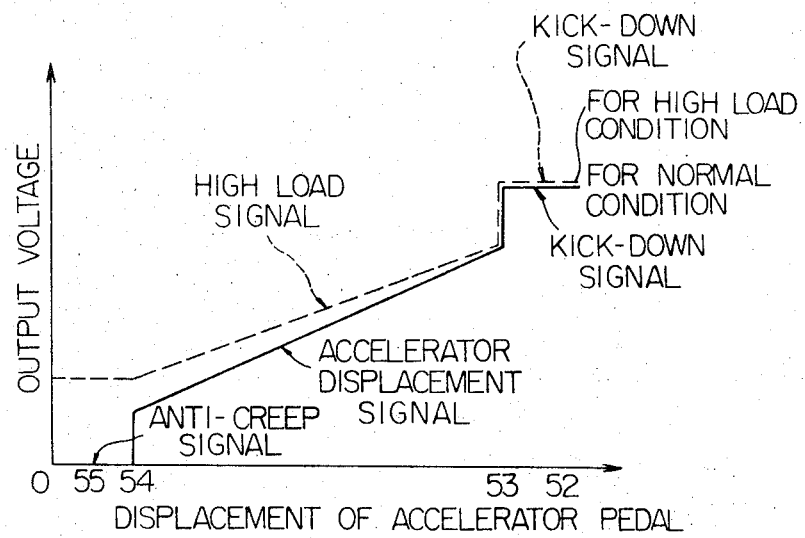
FIG. 14 is a graphical representation of an output voltage of an accelerator displacement detector or variable resistor element against the displacement of the accelerator pedal.

Referring first to FIGS. 12 and 13, the accelerator displacement detector 12 normally produces the accelerator displacement signal having a voltage substantially proportional to the accelerator displacement, when the switches 40 and 41 supply thereto a positive potential $Va$ from the energy source 10, and when the wiper arm 14 is positioned between the sliding contacts 52 and 54, as shown in FIG. 13. In this instance, a kickdown signal having a stepwise increased voltage is produced by the action of the resistor element 26 when the wiper arm 14 is moved from the sliding contact 53 to the contact 52. On the other hand, an anti-creep signal having ground potential is produced at the detector by the action of the resistor elements 28 and 29 when the switch 41 is closed to be grounded. The output voltage thus produced at the accelerator displacement detector 12 is illustrated as a solid line in FIG. 14, in which the numerals appearing along the abscissa are indicative of the resistor elements.

With the switch 41 being open, however, a high load signal is produced at the detector 12. This high load signal is shown as a dotted line in FIG. 14. The characteristics of these curves can be predicted from the fact that the resistor element 28 takes no operating part in determining the potential of the wiper arm 14. The high load signal assumes a constant positive value of voltage when the wiper arm is held on the resistor elements 54 and 55. As is apparent from such prediction, this value is larger than the value which is taken by the potential of the wiper arm 14 when it is on the resistor element 54 with the switch 41 closed. As the wiper arm is moved toward the resistor element 53, the value of this high load signal is also substantially linearly increased with a steeper slope than the former case in which the switch 41 is closed. Then, this value also experiences a stepwise increase when the wiper arm is moved between the resistor elements 53 and 52.

In either case, the output signal of the accelerator displacement detector 12 is supplied to the first-to-second and second-to-third comparators 30 to 33 and 35 to 38 through a gate circuit 83 of a diode. When, however, the switch 42 connects the energy source 10 directly with the two comparators 30 to 33 and 35 to 38, then a low-hold signal having a constant positive voltage independent of the accelerator displacement is supplied to the two comparators.

Figure 15:
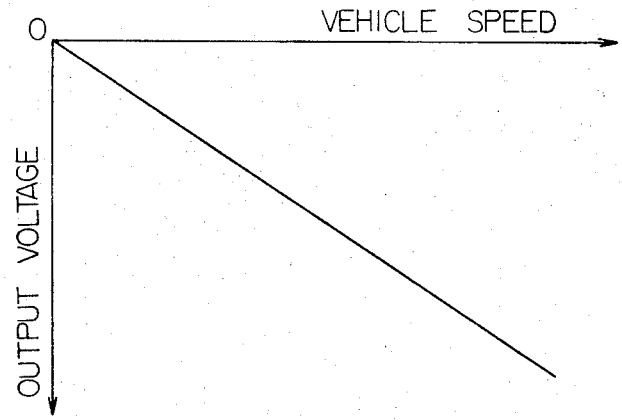
FIG. 15 is also a graphical representation of an output voltage of a vehicle speed detector or tachometric generator against the vehicle speed.

On the other hand, the vehicle speed signal having a negative polarity is substantially linearly increased of its absolute value with the increase of the vehicle speed as shown in FIG. 15. This vehicle speed signal is also supplied to the two comparators 30 to 33 and 35 to 38 in addition to the accelerator displacement signals for normal condition with the switch 41 closed or for high load condition with the switch 41 being open.

These two comparators respectively compare or divide the voltage values of the vehicle speed and accelerator displacement signals and then determine the threshold values of the first and second driving circuits 15' and 16'. These driving circuits 15' and 16' include, in this embodiment, transistors 15' and 16' of NPN type which are rendered conductive respectively when the divided voltages $Vc$ and $Vd$ exceed a predetermined positive value, as shown in FIG. 13. The sequences of the conducting operations of the two transistors 15' and 16' are similar to those of the first embodiment except that the former transistors 15 and 16 are of PNP type. Therefore, a first or low speed is effected in the automatic transmission when the two transistors 15' and 16' are conductive, and accordingly when the two solenoids 17 and 18 are energized or driven thereby. Then, the first speed signal appears at the line or terminal 70 of the first relay 21 as a result of actuation of the first solenoid 17. As will be easily understood, the second or intermediate signal is produced at the line or terminal 71 of the second relay 23 when the first solenoid 17 is rendered inoperative while the second solenoid 18 remains operative. Furthermore, the third or high speed signal is produced at the other terminal 72 when both the solenoids 17 and 18 turn inoperative. The production of this third speed signal is effected not only when the vehicle is running at a high speed with limited throttle opening but when the vehicle stands still with the switch 41 closed and with the wiper arm 14 positioned on the resistor element 55.

The resultant shift patterns both for the normal running condition with the switch 41 closed and for the high load running condition with the switch 41 being open can be made similar to those obtained from the first embodiment. Thus, reference may be made to FIGS. 5 and 8 together with the previous descriptions devoted to these figures.

Reverting now to FIGS. 12 and 13, the hysterisis feedback circuits 22' and 24' includes, in this embodiment, two transistors 22' and 24' of PNP type in place respectively of the relays 22 and 24. These two transistors 22' and 24' are rendered conductive to bypass the resistor elements 33 and 38 respectively when the two transistors 22' and 24' are rendered conductive. Thus, hysterisis phenomena are observed between the upshift and downshift patterns for the same gear shifts, as shown in FIGS. 5 and 8.

Figure 16:
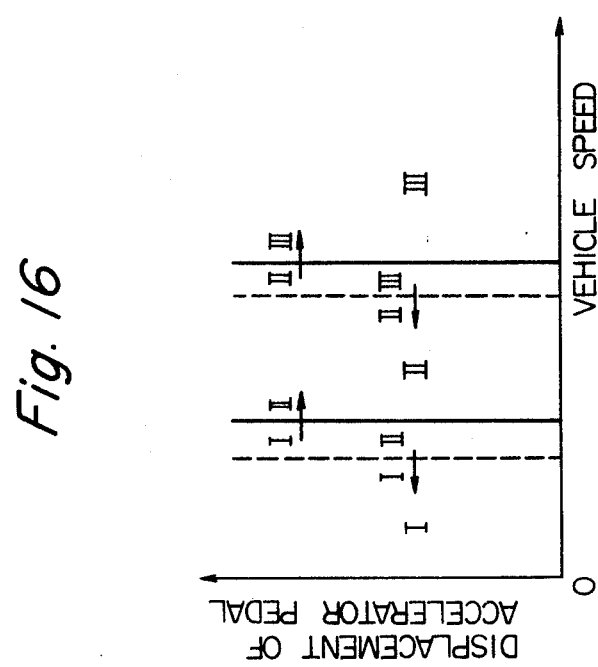
FIG. 16 is a graphical representation of resultant shifting patterns obtained when the low-hold operation is effected.

On the other hand, when the low-hold signal is applied to the comparators 30 to 33 and 35 to 38, then the conductivities of the two transistors 15' and 16' depend merely upon the voltage variations of the vehicle speed signal. This is because the low-hold signal has a constant positive voltage independent of the accelerator displacement, as has been discussed. In this instance, the resultant shift patterns, which are illustrated in FIG. 16, can be preset to reside at an allowable maximum vehicle speed for each of gear shifts, by suitably selecting the resistance of the resistor element 45. In FIG. 16, the solid lines indicate upshift patterns, while the dotted lines downshift patterns.

Figure 17:
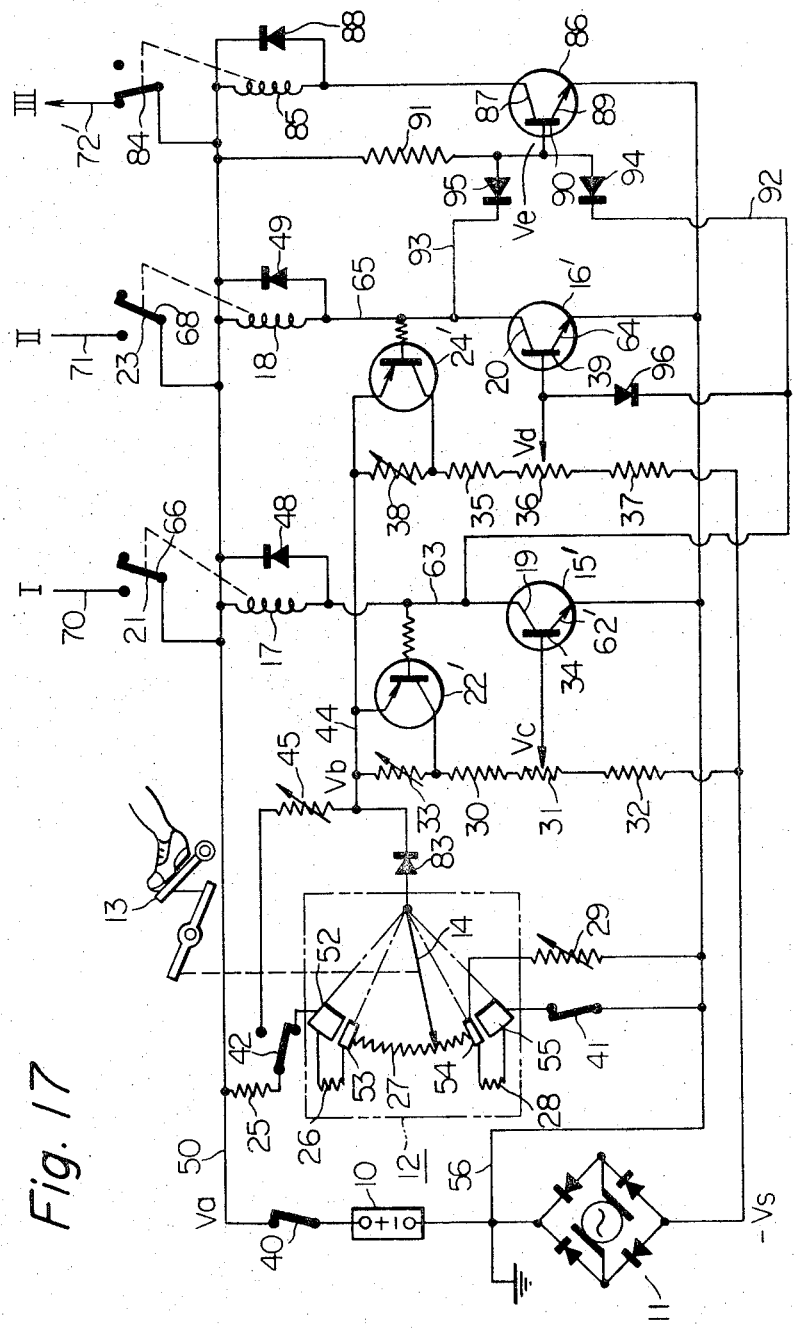
FIG. 17 is similar to FIG. 4, but shows still another embodiment of the control device.

Turning now to FIG. 17 showing still another embodiment of the invention, the electronic control circuit 80 further includes a third relay 84, a third solenoid 85 for actuating the third relay 84 when energized, and a third driving circuit having an NPN type transistor 86 for energizing the third solenoid 85. The third solenoid 85 is connected with the bus line 50 and with the collector 87 of the transistor 86. A diode 88 is connected with the bus line 50 and with the collector 87 in parallel with the third solenoid for permitting electric current only toward the bus line 50. The emitter 89 of the transistor 86 is grounded through the line 56. The base 90 of the transistor 86 is connected to the bus line 50 through a resistor element 91. The base 90 is also connected with the collector 19 of the transistor 15' and with the collector 20 of the transistor 16', respectively through lines 92 and 93. In these lines are provided two diodes 94 and 95 which form an AND logic circuit. The base 39 of the transistor 16' is, in this embodiment, connected with the line 92 through a diode 96.

With these electric connections, the additional transistor 86 is rendered conductive only when the two transistors 15' and 16' are kept inoperative, even though the base 90 thereof is normally biased from the bus line 50 through the resistor element 91. More specifically, when the transistor 15' is conductive providing the first speed signal at the terminal 70 with the base 34 potential Vc thereof exceeding a predetermined positive value, then the base potentials Vd and Ve of the two transistors 16' and 86 are grounded respectively through the diodes 96 and 94. Thus, the two transistors 16' and 86 are kept inoperative during the first speed running condition.

As the vehicle speed increases, the base potential Vc is decreased until it becomes below the ground potential, so that the transistor 15' turns inoperative. At this instance, the base potential Vd of the transistor 16' is determined merely by the resistance relationship of the resistor elements 35 to 38. In this case, such resistance relationship is preset to permit the potential Vd to have a predetermined positive level, when the ground circuit thereof is cut off by the action of the diode 96 when the transistor 15' is rendered inconductive. Then, the second solenoid 18 is energized by the transistor 16', which in turn actuates the second relay 23 to produced the second speed signal at the terminal 71 thereof. During this operation, however, the transistor 86 remains inconductive because the base potential Ve thereof is grounded through the diode 95 and the transistor 16'.

As the vehicle speed further increases, the base potential Vd becomes below the threshold value to turn the transistor 16' inoperative. Then, the two transistors 15' and 16' are rendered inconductive so that the potential of the energy source 10 is delivered to the base 90 of the transistor 86 through the bus line 50 and the resistor element 91. As a result, the transistor 86 is rendered conductive to energize the third speed signal at the terminal 72'.

The other operations such as kickdown, anti-creep, high load or low-hold operation are similar to those of the previous two embodiments. Therefore, a repeated discussion on such operations will be omitted.

According to an important feature of the present invention, the linear shifting patterns are available and an accurate shifting operation can be achieved since the vehicle speed signal supplied as a reference voltage proportional to the vehicle speed is derived from the tachometric generator interconnected with the output shaft of the vehicle.

According to another important feature of the invention, the hunting otherwise caused as the result of irregular operations of the accelerator pedal can he avoided by switching the switch 41 for transferring the shifting point to the higher vehicle speed side in accordance with the signal representing, for instance, the gradient of the ascent or descent on which the vehicle is running.

According to still another important feature of the invention, a sufficient braking by the engine can be effected by the operation of the switch 41 actuated by a signal representing the position of the brake pedal interlocked therewith or a manual switch.

According to still another important feature of the invention, an overload on the engine can be avoided since the engine operates at a low temperature at start by transferring the shifting point of the automatic transmission to the higher vehicle speed side in accordance with a signal representing the engine temperature.

According to still another important feature of the invention, an overrun of the engine can be avoided by the use of a shifting lever for raising the shifting point to the higher speed side when the engine speed reaches its maximum speed entirely independently of the displacement of the accelerator pedal.

According to still another important feature of the invention, a creep, which may occur when the vehicle stops, can be precluded by selecting the third speed for such a condition.

It is to be understood from the foregoing description that though the aforementioned embodiments have been described as to the circuit arrangements for the three speed automatic transmission, it may be applied to two or four or more speed automatic transmissions.

What is claimed is:

1. A control device for electrically controlling gear shifts of an automatic transmission of an automotive vehicle as a function of vehicle speed and displacement of an accelerator pedal, comprising: accelerator displacement detecting means for detecting displacement of the accelerator pedal to produce an accelerator displacement signal having a voltage substantially proportional to said displacement; kickdown means provided in said accelerator displacement means for producing a kickdown signal having a voltage stepwise changed from said accelerator displacement signal; switch means connected with said accelerator displacement detecting means for producing a high load signal having a voltage higher than said accelerator displacement signal when closed and for producing an anit-creep signal having a zero potential when being open while the vehicle stands still; switch means for selectively permitting therethrough said accelerator displacement signal, kickdown signal and anti-creep signal and for selectively permitting therethrough a low-hold signal having a constant voltage; vehicle speed detecting means for detecting vehicle speed to produce a vehicle speed signal having a voltage substantially proportional to said vehicle speed, said vehicle speed signal being of polarity opposite to that of said accelerator displacement signal and kickdown signal; at least one comparating means receptive of said vehicle speed signal and any of said accelerator displacement, kickdown, high load, anti-creep and low-hold signals selected for comparing the voltages of said vehicle speed and said any signal; at least one corresponding driving circuit connected with said comparing means for being rendered conductive when the compared voltages exceed their threshold values; and at least one corresponding relay means for being actuated by said driving means when it is energized to produce at their terminals a plurality of speed signals having a constant voltage, said speed signals being delivered to an electric circuit of an automatic transmission to effect a gear shift in accordance with the speed signals produced.

2. A control device according to claim 1, further comprising at least one hysterisis feedback circuit for stepwise changing the voltage levels to be compared by said comparing means in response to the conductions of said driving circuits to produce a hysterisis between the upshift and downshift for the same gear shift.

3. A control device according to claim 1, further comprising a gate circuit for permitting said any signal to flow only toward said comparing means.

4. A control device according to claim 1, further comprising relay means for producing at its terminal the highest speed signal when actuated, a driving circuit for actuating the last-named relay means when rendered conductive, a logic circuit for rendering the last-named driving circuit only when said at least one driving circuit is kept inconductive, and a gate circuit for prohibiting said at least one driving circuit from being conductive.

* * * * *